Patented Apr. 18, 1939

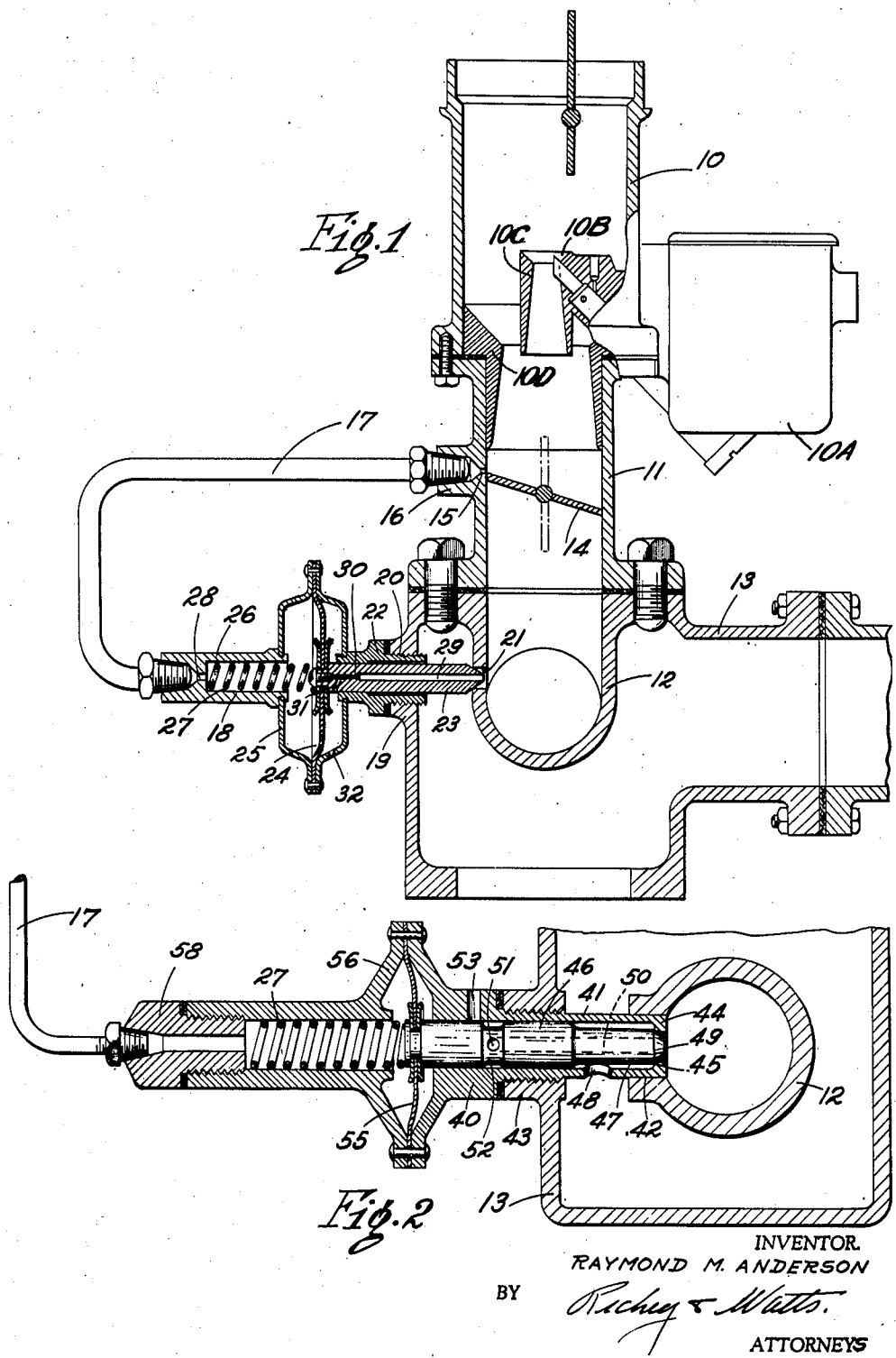

2,154,417

UNITED STATES PATENT OFFICE 2,154,417

FUEL CONTROL FOR INTERNAL COMBUSTION ENGINES

Raymond M. Anderson, Detroit, Mich., assignor of one-half to Harold D. Church, Cleveland Heights, Ohio Application November 6, 1937, Serial No. 173,223

8 Claims. (Cl. 123—119)

This invention relates broadly to hydrocarbon motors and more specifically to apparatus for controlling the temperature, pressure and volume of the fuel mixture during the periods of operation of the engine when the throttle is positioned in partly open adjustment.

As is well known in the art, when the carburetor throttle of an internal combustion engine is nearly closed, as in idling, a sub-atmospheric pressure is created in the intake manifold which imposes a load upon the engine proportional to the vacuum. Thus in the normal operation of an engine at low speeds the power required to turn the motor over is relatively high, and less fuel per delivered horsepower hour is required as the throttle position approaches wide open adjustment.

Efforts have been made heretofore to improve the fuel economy of hydrocarbon engines and reduce the vacuum load or so-called pumping loss therein. These efforts have been directed generally to the provision of a relatively small hole in the intake manifold which permitted the admission of ambient air to dilute the fuel mixture, and also reduced the cylinder and manifold vacuum. Although this expedient could be used to determine the efficiency of the carburetor setting at certain known speeds and loads, it was commercially unsatisfactory as a fuel economizer since the dilution of the mixture could not be controlled throughout the entire range of operation of the engine, or when the engine was cold and it was necessary to enrich the mixture by the use of a choking device.

In the present invention the principle of fuel mixture dilution is employed, but instead of admitting a constant charge of air to the intake manifold gases are taken from the exhaust manifold at a point where the temperatures are relatively high and a restricted volume of air is substituted therefor. In addition the admission of such diluent is metered by a valve mechanism operatively controlled by the sub-atmospheric pressure in the intake manifold which in turn is governed by the carburetor throttle during certain periods of operation of the engine. With such device it will be recognized that the function of the carburetor as a proportioning device for air and fuel will be unaltered although dilution of the fuel mixture produced thereby will be effected at certain throttle positions.

Referring to the drawing:

Fig. 1 is a vertical section through a fragmentary portion of a carburetor, an exhaust manifold of the type in which a portion of the intake pipe is incased by the exhaust manifold and the valve mechanism embodying the present invention; and Fig. 2 is a vertical section through a fragmentary portion of a manifold of the above type and a modified form of the valve mechanism illustrated in Fig. 1.

Referring first to Fig. 1, the carburetor 10, which as illustrated comprises a float chamber 10a, jet 10b, primary venturi 10c and secondary venturi 10d connected to the intake pipe 11 mounted on the intake manifold 12, which as illustrated herein is formed with a portion thereof enveloped by the exhaust pipe 13. Within the intake pipe 11 intermediate the carburetor and intake manifold 12 there is a throttle valve 14 operatively controlled by linkage (not shown) of the type in general use in automobile construction. The intake pipe 11 is formed with a port 15 disposed on the carburetor side of the throttle valve 14 in a plane substantially normal to the axis thereof and in juxtaposition with the peripherial edge of the valve in its closed or idling position. The wall of the pipe 11 adjacent the port 15 is preferably formed with a boss 16 which is tapped for the reception of a pipe coupling and conduit 17 connected with a valve 18 and the operating mechanism therefor.

The exhaust pipe 13 is formed with a boss 19 having an opening 20 therein in axial alignment with a valve seat 21 in the intake manifold 12. Within the opening 20 there is a valve guide housing 22 for the support of a reciprocative valve plunger 23 which is formed with a conical end portion engageable with the valve seat 21. The opposed end of the valve plunger 23 is connected to a diaphragm 24 having the peripheral edge thereof mounted in a housing 25. Upon the outer face of the diaphragm housing there is a frame 26 dulled and tapped to receive a coupling for the conduit 17 and bored for the reception of a compression spring 27 which is impinged between the diaphragm 24 and the end wall of the bore. A port 28 is provided in the outer end of the frame 25 to facilitate fluid communication between the intake pipe 11 and the chamber defined by the housing 25 and diaphragm 24. The valve plunger 23 is formed with a longitudinal bore 29 having a restriction 30 therein to effect the expansion of air admitted through the inner end of the bore 29, the cross bore 31 and the aperture 32 in the housing 25.

As illustrated in Fig. 2 the diaphragm housing 40 is formed with a cylindrical extension 41, the outer end of which is machined to snugly engage, as with a light drive fit, the opening 42 in the intake manifold 12. The outer diameter of the cylindrical extension 41 is constructed so that the opening 42 may be formed by the tap drill employed when machining the boss 43 in the exhaust manifold 13 though it is to be understood that the external diameter of the cylindrical extension is not essentially limited to such size or construction. The end of the extension 41 is formed with a shoulder 44 chamfered upon its inner face to form a valve seat 45 for the conical end of the valve plunger 46. The end of the valve plunger is provided with a reduced shank portion 47 to facilitate the circulation of the gas or the burnt products of combustion admitted through transverse openings 48 in the cylindrical extension 41 and the port 49 in the shouldered end 44 of the cylinder. The valve plunger 46 is machined with a longitudinal bore 50 which communicates with a transverse opening 51, and an annular groove 52 arranged for communication with a port 53 upon reciprocation of the valve plunger 46 so that atmospheric air will be commingled with the exhaust gas when the valve 46 is lifted off its seat. The outer end of the plunger 50 is connected to a diaphragm 55 having the peripheral edge thereof mounted between the flanged portions 56 of the diaphragm housing 40. The outer end of the housing 40 is bored to receive a helical spring 27 retained in compressive adjustment against the diaphragm 55 by a nut 58 mounted in the end portion of the housing 40. The nut 58 is tapped to receive a fitting for the support of the tube 17 and is drilled to afford fluid communication between intake pipe and the chamber defined by the housing 40 and diaphragm 55.

In operation when the throttle valve 14 is progressively opened beyond the idling position varying percentages of subatmospheric pressure in the intake pipe are transmitted through the conduit 17 to the chamber in the outer end of the diaphragm housing where they overcome the force of the spring 27, and thus effect the retraction of the valve plunger from its seat. As the valve is opened gases from the exhaust manifold will be admitted to the intake pipe where they will commingle with the air admitted through the bore 29 in the plunger valve, and thus cause dilution of the fuel mixture, reduction of the sub-atmospheric pressure in the intake pipe 11 and reduction of the pumping losses of the engine. Moreover, the introduction of hot exhaust gases in the intake pipe will cause the expansion of the fuel mixture and thus increase the velocity and atomization of the charge delivered to the cylinders of the engine. The atmospheric air admitted through the passage 29 (Fig. 1) in the plunger valve affords further dilution of the fuel mixture in the intake pipe and in addition prevents the portion of the plunger valve which is engaged with the valve seat 21 from being overheated and unduly carbonized.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. In an internal combustion engine embodying an intake pipe having a throttle therein and an exhaust pipe surrounding a portion of the intake pipe, mechanism to reduce the vacuum in said intake pipe during the operation of said engine comprising a valve adapted to admit exhaust gas and atmospheric air to said intake pipe, a pressure responsive device operatively connected to said valve, a conduit connected with said pressure responsive device and with said intake pipe, said conduit being disposed in relation to said throttle to effect communication between said pressure responsie device and said intake pipe as said throttle is open.

2. In an internal combustion engine embodying an intake pipe having a throttle therein and an exhaust pipe surrounding a portion of said intake pipe for heating a portion thereof, mechanism for reducing the vacuum in the intake pipe during the operation of the engine comprising a valve in the intake pipe adjacent said connection with the exhaust pipe, fluid means for operating said valve to admit a diluent of exhaust gas and air into said intake pipe, said fluid means being controlled by said throttle to open said valve as said throttle is adjusted toward its open position.

3. In an internal combustion engine embodying an intake pipe having a throttle therein and an exhaust pipe, mechanism for reducing the vacuum in said intake pipe during the operation of the engine comprising a plunger valve for admitting exhaust gas and air into said intake pipe, vacuum responsive mechanism operatively connected with said plunger valve, the walls of said plunger valve defining a passage for the admission of atmospheric air into the intake pipe in the zone in which the exhaust gas is admitted, and means coordinated with said throttle for opening said valve coincident the initial opening of said throttle and a spring for closing said valve as the throttle approaches its open position.

4. In an internal combustion engine embodying an intake pipe having a throttle therein and an exhaust pipe surrounding a portion of the intake pipe, mechanism to reduce the piston pumping load in said engine during the operation thereof comprising a valve adapted to admit exhaust gas and air into said intake pipe, vacuum responsive means connected with said valve, a conduit connecting said vacuum responsive means with said intake pipe, said conduit being disposed in said intake pipe in juxtaposition with said throttle, whereby fluid communication to the engine side of said intake pipe is closed when said throttle is adjusted in its closed position and open when said throttle is adjusted in its open position.

5. In an internal combustion engine embodying an intake pipe having a throttle therein and an exhaust pipe surrounding a portion of said intake pipe for heating a portion thereof, mechanism for the dilution of the fuel mixture in said intake pipe comprising a valve for admitting exhaust gas into said intake pipe, vacuum operated means controlled by said throttle for operating said valve, said valve being arranged to admit hot exhaust gas and atmospheric air to said intake pipe to effect the atomization of the fuel mixture therein.

6. In an internal combustion engine embodying an intake pipe having a throttle therein and an exhaust pipe surrounding a portion of said intake pipe for heating a portion thereof, mechanism for the dilution of the fuel mixture in said intake pipe comprising a valve for admitting exhaust gas into said intake pipe, vacuum operated means controlled by said throttle for operating said valve, said valve being arranged to admit hot exhaust gas to said intake pipe for effecting the atomization of the fuel mixture therein and means to facilitate the admission of atmospheric air into the intake pipe in the zone controlled by said valve.

7. In an internal combustion engine embodying an intake pipe having a throttle therein and an exhaust pipe, mechanism for reducing the vacuum in said intake pipe during the operation of the engine comprising a valve adapted to admit exhaust gas and air into said intake pipe, said valve having a longitudinal bore therein having fluid communication with atmosphere, vacuum controlled operating mechanism therefor, a conduit connecting said operating mechanism with said intake pipe, the opening therein being disposed adjacent the throttle plate on the carburetor side thereof, whereby said operating mechanism will effect the opening of said valve upon opening of said throttle and open communication of the longitudinal bore with atmosphere for cooling the end portion of said valve.

8. In an internal combustion engine embodying an intake pipe having a throttle therein and an exhaust pipe, mechanism for reducing the vacuum in said intake pipe during the operation of the engine comprising a valve having a longitudinal bore therein adapted to admit exhaust gas and air into said intake pipe, the atmospheric air being admitted through said bore for cooling said valve, vacuum controlled operating mechanism therefor, a conduit connecting said operating mechanism with said intake pipe, the opening therein being disposed adjacent the throttle plate on the carburetor side thereof, whereby the vacuum in said intake pipe will actuate said operating mechanism as said throttle is opened.

RAYMOND M. ANDERSON.